Dec. 25, 1923.
R. H. STALEY
1,478,842
METHOD AND MEANS FOR WORKING CLAY
Filed May 23, 1922
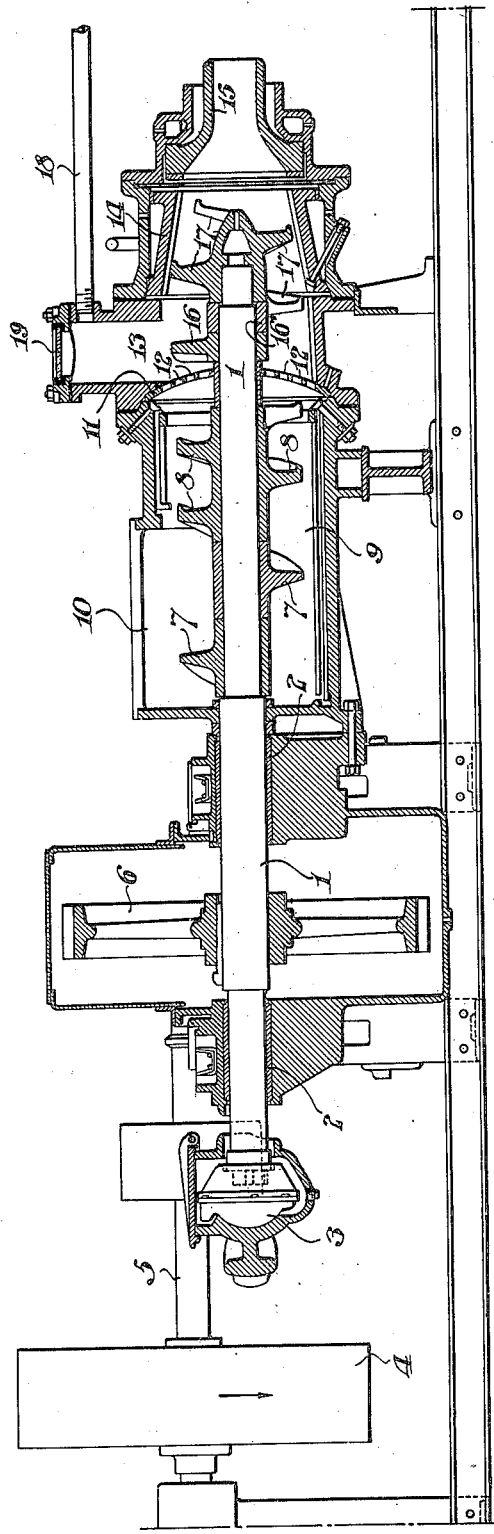
Inventor:
Raleigh H. Staley,
By Mc Clondale
Attorney.

Patented Dec. 25, 1923.

1,478,842

UNITED STATES PATENT OFFICE.

RALEIGH H. STALEY, OF SPRINGFIELD, ILLINOIS, ASSIGNOR TO CHAMBERS BROTHERS COMPANY, A CORPORATION OF PENNSYLVANIA.

METHOD AND MEANS FOR WORKING CLAY.

Application filed May 23, 1922. Serial No. 562,966.

*To all whom it may concern:*

Be it known that I, RALEIGH H. STALEY, a citizen of the United States, residing at Springfield, in the county of Sangamon, State of Illinois, have invented a new and useful Method and Means for Working Clay, of which the following is a specification.

The invention relates to improvements in working clay. The object is to provide improved method and means for operating upon clay in the production of bricks or similar objects.

The invention comprises improved method and means for treating the clay prior to and during the extruding operation, which consists in shredding or breaking up the clay, removing the air therefrom, and then forcing the clay, so treated, to and through the die.

The invention comprises a simplification and increased efficiency over the method and means described in my Patent No. 701,957, dated June 10, 1902.

The drawing, which illustrates merely by way of example, a preferred embodiment of my invention, is a longitudinal vertical section of part of a brick machine containing the invention.

The shaft 1 is mounted on suitable bearings as at 2, and is provided with the thrust device, as at 3. The driving pulley 4 is mounted on the countershaft 5 which is geared to the gear wheel 6. The shaft 1 is provided with the elements 7 and 8 in worm formation. This worm formation is enclosed in the chamber 9, provided with the opening 10 connected to any suitable form of hopper or chute not shown. At the forward end of the chamber 9, is provided the disc or partition 11, having a series of perforations or openings 12, in relatively close formation. These openings 12 deliver to the chamber 13 which communicates with the nozzle formation 14 and the die 15. In the chamber 13 is provided the single blade element 16 which has an active face inclined to the plane of its rotation, so as to work the clay and move it toward the extrusion screw or auger 17. The blade element 16 and the auger screw 17 are both mounted on the forward end of the shaft 1 and are separated by the spacing sleeve 16'. Connected with the chamber 13 is the pipe 18 leading to any suitable air exhausting means, not shown. At the top of the chamber 13 I have provided the panel of heavy glass, as at 19, forming an air-tight closure for said chamber.

In operation the clay is introduced at 10 into the chamber 9 and is carried by the rapid pitch of elements 7 to the forward end of chamber 9; by which means said forward end is kept practically filled with clay. The elements 8 force the clay through the openings 12 of partition 11 into the chamber 13 in a plurality of small streams, in a shredded or broken up condition. The blades 16 move the clay forwardly into the nozzle 14, whence the auger 17 forces the same through the extrusion orifice or die 15. The clay passing through the openings 12 and through the die 15 forms an air seal with respect to said openings and die, so that chamber 13 becomes a practically air-tight chamber. By exhausting the air from said chamber 13 through pipe 18, a partial vacuum is created in said chamber, and a substantial portion of the air is extracted from the clay contained in the said chamber, and because of said partial vacuum, the amount of air imprisoned by the clay, as it is compressed into the bar extruded through die 15, is reduced to a minimum. This greatly improves the structure of the product by preventing, to a very large extent, the lamination which is one of the principal causes of weakness in the ordinary auger made brick. The glass closure 19 affords convenient means for observing the conditions within the vacuum chamber 13.

What I claim is:—

1. The method of treating clay, which consists in introducing the clay in a plurality of relatively small streams into an enclosed space, exhausting the air from said space and then extruding the clay therefrom.

2. The method of treating clay, which consists in introducing the clay into an enclosed space, causing it to break up in relatively small bodies before it enters the chamber, exhausting the air from said space and extruding the clay therefrom, in substantially the same horizontal lines of travel as that along which it enters.

3. In a device of the character described, the combination of means forming an enclosed chamber provided with an extrusion orifice, means for forcing clay into said chamber in a plurality of separated streams, means for exhausting air from said chamber and means for extruding the clay therefrom.

4. In a device of the character described, the combination of means forming an enclosed chamber provided with an extrusion orifice, means including an operating shaft for forcing clay into said chamber in a broken up state, means for exhausting air from said chamber and means mounted on said shaft for extruding the clay therefrom.

5. In a device of the character described, the combination of means forming an enclosed chamber provided with an extrusion orifice, means including an operating shaft for forcing clay into said chamber, means for exhausting air from said chamber, means mounted on said shaft for moving the clay horizontally in the chamber toward an extruding device and means for extruding the clay therefrom.

6. In a device of the character described, the combination of means forming an enclosed chamber provided with an extrusion orifice, means for introducing clay into said chamber, means for exhausting air from said chamber, means for working the clay in said chamber and causing its movement in a horizontal direction and means for extruding the clay therefrom in substantially the same horizontal lines of travel as that along which it enters.

7. In a device of the character described, the combination of means forming an enclosed chamber provided with an extrusion nozzle and die, means connecting the chamber with an air exhausting device, a worm formation for introducing the clay into said chamber, a knife formation for working the clay in the chamber and moving it horizontally therein, an auger formation for extruding the clay through the die, and a rotating shaft common to the worm, knife and auger formations.

8. In a device of the character described, the combination of means forming an enclosed chamber provided with an extrusion nozzle and die, means connecting the chamber with an air exhausting device, a worm formation for introducing the clay into said chamber, means for breaking up the clay as it enters the chamber, a knife formation for working the clay in the chamber and moving it horizontally therein, an auger formation for extruding the clay through the die, and a rotating shaft common to the worm, knife and auger formations.

9. In a device of the character described, the combination of means forming an enclosed chamber provided with an extrusion nozzle and die, means connecting the chamber with an air exhausting device, a wall element provided with apertures through which the clay is introduced into said chamber in a plurality of separated streams, a worm formation for introducing the clay into said chamber, a knife formation for working the clay in the chamber and moving it horizontally therein, an auger formation for extruding the clay through the die, and a rotating shaft common to the worm, knife and auger formations.

RALEIGH H. STALEY.